United States Patent
Andersson et al.

(10) Patent No.: US 6,841,961 B2
(45) Date of Patent: Jan. 11, 2005

(54) METHOD AND REGULATOR FOR ELECTRICAL RELUCTANCE MACHINES

(75) Inventors: Christer Andersson, Helsingborg (SE); Henrik Stendahl, Helsingborg (SE)

(73) Assignee: Emotron AB, Helsinborg (SE)

(*) Notice: Subject to any disclaimer, the term of this patent is extended or adjusted under 35 U.S.C. 154(b) by 46 days.

(21) Appl. No.: 10/006,202

(22) Filed: Dec. 10, 2001

(65) Prior Publication Data

US 2003/0094918 A1 May 22, 2003

Related U.S. Application Data

(63) Continuation of application No. 09/485,062, filed as application No. PCT/SE98/01483 on Aug. 18, 1998, now Pat. No. 6,339,307.

(30) Foreign Application Priority Data

Aug. 18, 1997 (SE) .............................................. 9702896

(51) Int. Cl.$^7$ .............................................. G01R 31/06
(52) U.S. Cl. ....................... 318/490; 318/471; 318/701
(58) Field of Search ................................ 318/254, 471, 318/490, 701

(56) References Cited

U.S. PATENT DOCUMENTS

| | | | |
|---|---|---|---|
| 4,447,787 A | * 5/1984 | Schwesig et al. | ........... 318/803 |
| 4,678,248 A | * 7/1987 | Depenbrock | ................ 318/805 |
| 4,740,738 A | 4/1988 | El Antably et al. | |
| 5,043,643 A | 8/1991 | Hedlund et al. | |
| 5,140,243 A | 8/1992 | Lyons et al. | |
| 5,321,342 A | * 6/1994 | Kruse | |
| 5,371,458 A | * 12/1994 | Heikkila | ................ 318/802 X |
| 5,502,360 A | * 3/1996 | Kerkman et al. | ........... 318/805 |
| 5,589,754 A | * 12/1996 | Heikkila | ..................... 318/805 |
| 5,637,974 A | 6/1997 | McCann | |
| 5,867,004 A | 2/1999 | Drager et al. | |

FOREIGN PATENT DOCUMENTS

| WO | WO/8802951 | * 10/1987 |
|---|---|---|
| WO | WO/9711524 | * 9/1996 |

* cited by examiner

Primary Examiner—Bentsu Ro
(74) Attorney, Agent, or Firm—Burns, Doane, Swecker & Mathis, L.L.P.

(57) ABSTRACT

The invention relates to a process for estimating an instantaneous resistance in a phase winding in a reluctance machine. The process comprises the steps of: receiving a signal indicating a voltage across at least one phase winding; receiving a signal indicating a current through the phase winding; estimating a magnetic flux in response to the voltage signal and the current signal; estimating an instantaneous resistance in the phase winding in according with a phase relation between the current signal and the magnetic flux signal. The invention also relates to a method for controlling an electrical machine and a drive system for performing the method.

11 Claims, 10 Drawing Sheets

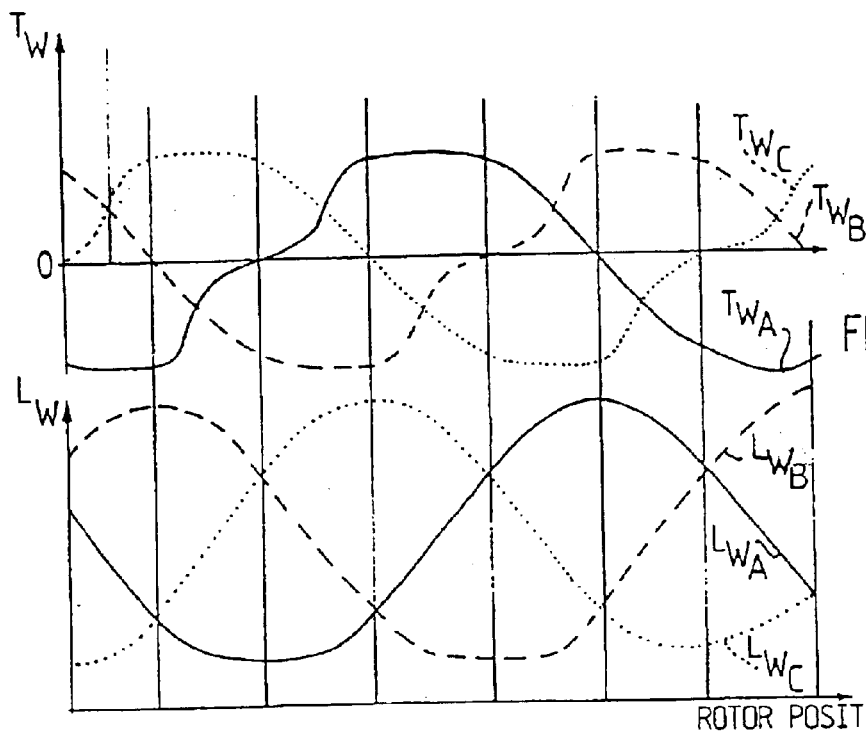
FIG. 2B
FIG. 2A
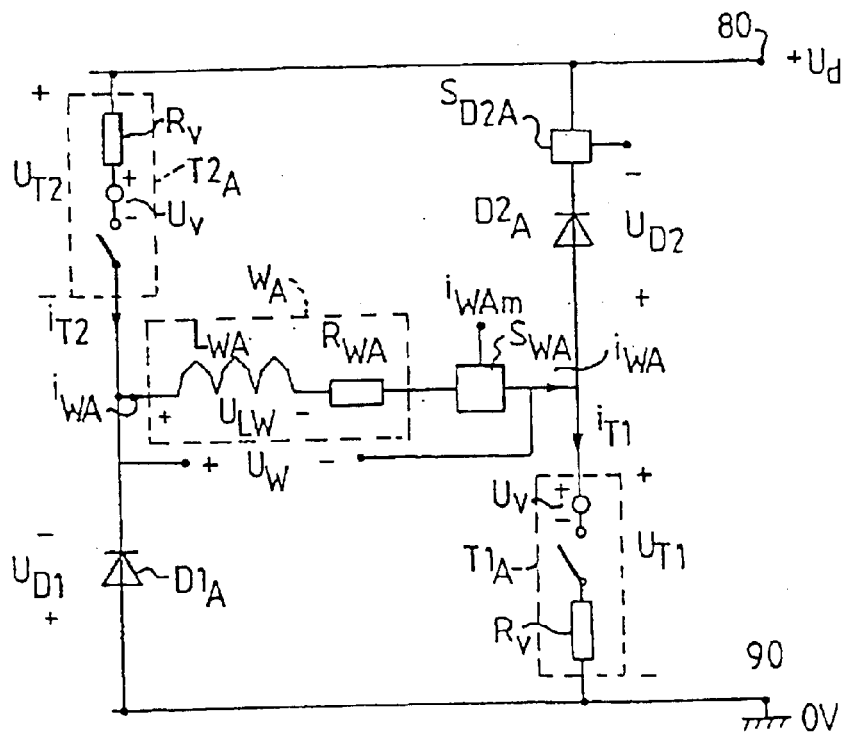
FIG. 4

METHOD AND REGULATOR FOR ELECTRICAL RELUCTANCE MACHINES

This application is a continuation of U.S. application Ser. No. 09/485,062 filed on Feb. 17, 2001, now U.S. Pat. No. 6,339,307 which was a national stage filing under 35 U.S.C. §371 of International Application No. PCT/SE98/01483 filed on Aug. 18, 1998, which International Application was published by the International Bureau in English on Feb. 25, 1999.

FIELD OF THE INVENTION

The present invention relates to a method for the control of an electrical machine, a drive system and a method for determining the mutual position of moving parts in an electrical machine.

STATE OF ART

Electrical machines have two parts which are movable in relation to each other, commonly called the "stator" resp. the "rotor". The most common types of electrical motors have a rotor which is an element which is suspended so that it can rotate inside a stator. The motor is provided with coils which can be provided with electrical current, whereby a magnetic flow is produced. The rotor in combination with the stator form a magnetic circuit through which the magnetic field produced by the coils flows.

When the mutual position between the rotor and the stator changes then the reluctance in the magnetic circuit changes.

In order to drive a reluctance motor with a number of windings the current is connected to the windings in a way which depends upon the position of the rotor in relation to the stator.

A known way of providing this control of the current includes sensing the position of the rotor with the help of separate position sensors coupled to the rotor, whereby the position sensors produce an output signal which depends on the position of the rotor.

Another known way of achieving control of phase currents uses the fact that the inductance of a phase varies depending on the position of the rotor in relation to the stator. The patent publication PCT/SE87/00442 describes a method of determining the position of the rotor for a reluctance machine starting from the equation $$(U-Ri)=d/dt(Li),$$

where i is the current through the phase windings, where U is the voltage across a series connection of the phase winding, a transistor valve and a current sensor resistor, and where R is a predetermined constant corresponding to the sum of the resistances in a phase winding, an activated transistor and a current measuring resistor.

WO 97/11524 discloses a method for estimating the rotor position of a switched reluctance motor by estimating a phase flux from at least one conducting phase, estimating an inductance in at least one non-excited phase, sampling phase currents and combining the estimated phase flux with the estimated inductance.

DISCLOSURE OF THE INVENTION

The present invention relates to the problem of obtaining an improved determination of the mutual position of movable parts in a reluctance machine.

This above mentioned problem is addressed by a method comprising the steps of: generating a signal corresponding to a current through a phase winding; generating a signal corresponding to a voltage across the phase winding; producing an amplitude signal value depending on the current signal, the voltage signal and a parameter value, the parameter value substantially corresponding to a resistive loss in the phase winding; and establishing a position value depending on the amplitude signal value. The method further includes the step of generating the parameter value in accordance with a relation between the current signal and the amplitude signal.

The invention fierier relates to the problem of providing improved regulation of the torque of an electrical machine without any separate sensor for detecting the position of the rotor by means of the shaft of the motor.

More precisely, the invention relates to the problem of producing improved regulation of the torque at both high and low rotation speeds without separate rotor position sensors.

Further, the invention relates to the problem of providing control of the torque of a reluctance motor with the use of estimations of phase winding values such as the reluctance values or magnetic flow, in order to determine the position of the rotor. The invention also concerns the control of the torque of the motor with the help of estimated phase winding values, wherein the phase winding values are estimated with improved accuracy and with reduced or completely eliminated dependence on the speed of rotation of the motor and the temperature of the motor windings.

A reluctance machine comprises two mutually movable parts and at least one phase winding which has a resistance and the inductance of which depends on the mutual position of the parts. A device for regulating a reluctance machine comprises a controllable valve, which is connected in series with the phase windings and which is adjustable between an essentially open state and a conducting state. The above mentioned problems are solved with a method for controlling of the valve comprising the steps of:

a) measuring a current thorough the phase winding;

b) measuring a voltage across the phase winding;

c) producing a signal value depending on the measured current value and the measured voltage value in accordance with a mathematical expression comprising an adjustable parameter;

d) determining a relationship value between the signal value and the measured current value;

e) adjusting the parameter value depending on the relationship value.

The invention uses the fact that the magnetic flow is in phase with the winding current for a machine of the above described type, in order to estimate the magnetic flow depending on a measured current value, and in order to with increased accuracy control the electrical machine.

According to one embodiment a signal value is produced corresponding to the magnetic flow $\psi$ in accordance with the mathematical expression $$\psi = \int U_{LW} d\tau$$

where $$U_{LW}=K_3{}^*U_d+i_W{\cdot}K_1+K_2$$

The adjustable parameter value $K_1$ relates to the resistance in the phase winding, the parameter $K_2$ corresponds to a voltage drop in the valve, and the parameter $K_3$ depends on the actual working state of the machine.

The above described solution gives the advantage that the estimate automatically adapts the control parameter $K_1$ so that the magnetic flow estimate has a good correspondence with the true magnetic flow even when the winding of the motor changes its series resistance $R_w$, e.g. as a consequence of temperature changes. If the voltage $U_d$ is determined over both the phase winding and the valve then the parameter $K_1$ is also adapted with reference to possible resistance changes in the valve.

BRIEF DESCRIPTION OF THE FIGURES

FIG. 2A illustrates that the inductance in a winding in a machine according to FIG. 1A varies, depending on the mutual position between the movable parts.

FIG. 2B illustrates the positional dependence of the torque which can be obtained by activating of a phase winding.

FIG. 4 is an equivalent circuit diagram for one of the valve bridges of FIG. 3.

PREFERRED EMBODIMENTS

For the sake of simplicity, the invention will be described in the following with reference to rotating machines. The invention is, however, not limited to rotating machines but that which is described is also applicable to other machines, such as e.g. linear machines where a moving pal made of a soft magnetic material is linearly displaceable along a straight linear stator with a number of stator windings.

Figure 1A:
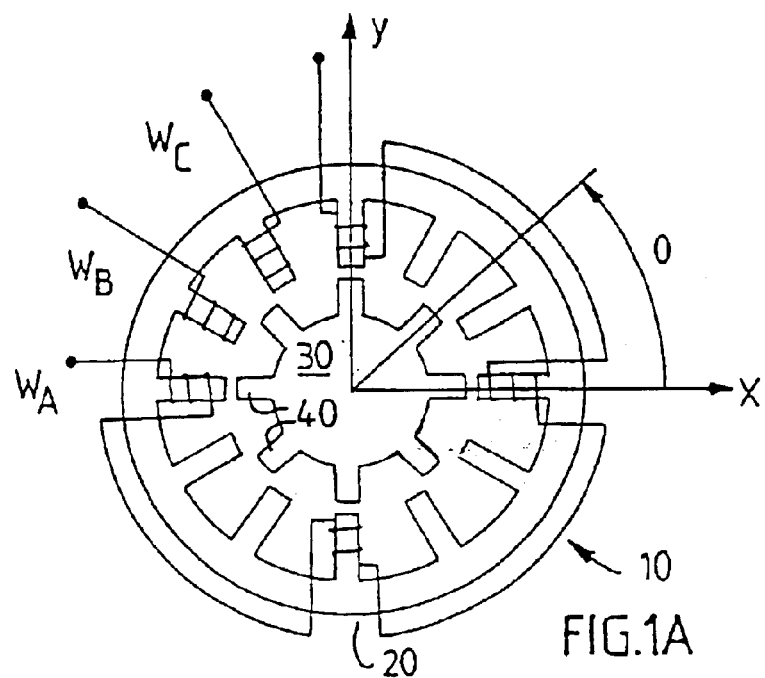
FIG. 1A is a schematical principle sketch of an electrical machine with two mutually movable parts and phase windings.

FIG. 1A is a schematic view which illustrates an embodiment of a reluctance motor 10 with a stator 20 and a rotor 30 rotatable inside the stator.

The stator 20 is provided with three separate windings $W_A$, $W_B$ and $W_C$, respectively.

According to one embodiment the rotor is manufactured from a soft magnetic material comprising a number of projections 40 as illustrated in FIG. 1A. The soft magnetic material is a ferromagnetic material which, when it has been magnetized once, can very easily be demagnetized, i.e. only a small coercive power is required for removal of the magnetism which arose when the material was magnetized. According to one version of the invention the rotor comprises soft magnetic iron. According to one embodiment also the stator includes a soft magnetic material, such as e.g. soft magnetic iron.

When the rotor is turned around a central shaft, its position changes, which is illustrated by means of the angular position θ in FIG. 1A. As illustrated in FIG. 1, an imaginary co-ordination system has its origin at the central shaft of the motor, with two mutually orthogonal axes x resp, y. The position of the rotor can then be defined as the angular position θ of a rotor projection 40 in relation to the x-axis.

Figure 1B:
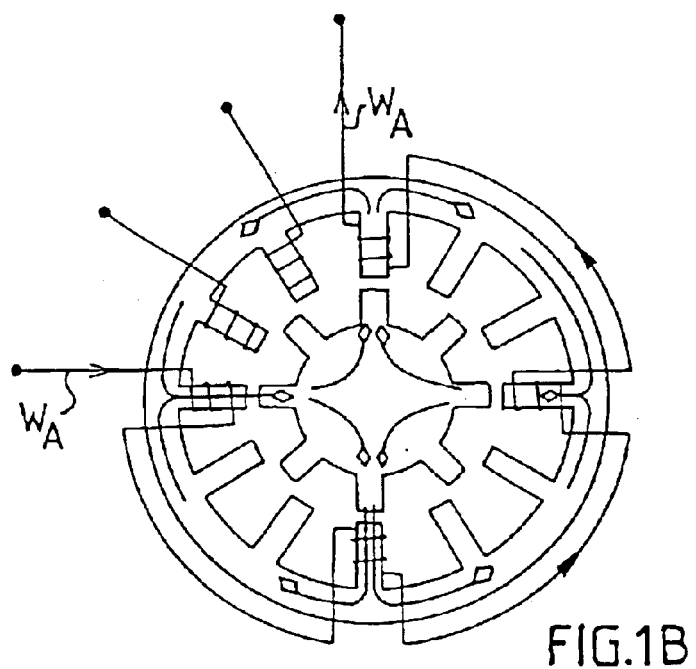
FIG. 1B illustrates a magnetic flow in the machine according to FIG. 1A.

When current is driven through a winding, e.g. winding $W_A$, a magnetic flow which flows from the stator via the rotor and back to the stator is produced, and thereby a magnetic circuit is produced. FIG. 1B illustrates an example of such a magnetic circuit for a three-phase reluctance motor in the case that current would be driven through the winding $W_A$ when the projection of the rotor is directed towards the parts of the stator where the magnetic field-producing windings $W_A$ is placed. It should be noted that FIG. 1B only illustrates the principle for the magnetic flow and should not be interpreted such that the current necessarily must be driven through a winding when the rotor is in the position shown in FIG. 1B.

The current to the phase windings of the motor should be regulated so that the current is supplied when the position of the rotor in relation to the stator is such that the torque of the motor is optimized.

FIGS. 1A and 1B illustrate a machine with three windings, the rotor of which has eight projections and the stator of which has twelve projections. According to a preferred embodiment the rotor, however, has four projections, so-called salient poles, and the stator has six projections.

FIG. 2A illustrates how use inductance varies in the winding $W_A$ depending on the position θ of the rotor.

FIG. 2B illustrates the torque which can be obtained, in rotor position θ, by activation of a phase winding. By comparing the curves illustrating the inductance $L_{WA}$ for the winding $W_A$ to the torque $T_{WA}$ achieved by activation of the winding $W_A$, i.e. the solid lines in FIG. 2A and FIG. 2B, respectively, it can be seen that a positive torque is obtained from the winding $W_A$ if this winding is activated when the inductance has a positive derivative.

One Embodiment of a Control Apparatus

Figure 3:
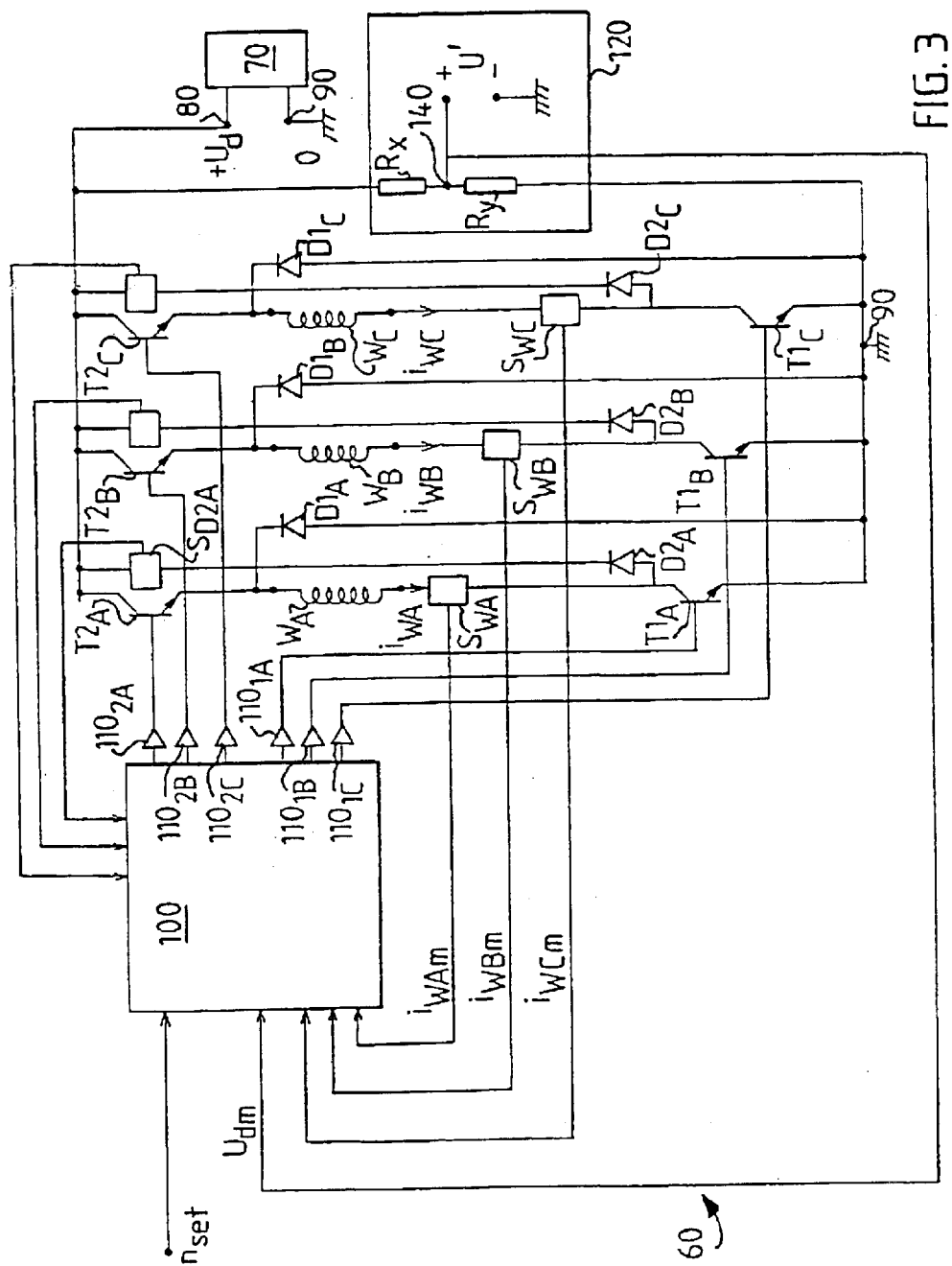
FIG. 3 illustrates a control apparatus with valve bridges connected to the phase windings in the motor according to FIG. 1A.

FIG. 3 illustrates a control apparatus 60 connected to the three phase windings $W_A$, $W_B$ and $W_C$. The control apparatus 60 comprises a power source 70 which supplies a DC-voltage with an amplitude of $+U_d$ to a connection 80.The phase winding $W_A$ is coupled between the ground connection 90 of the voltage source and the plus pole 80 via a circuit which comprises a current sensor $S_{WA}$, a power transistor $T1_A$ and a power transistor $T2_A$, as shown in FIG. 3.

A diode $D1_A$ is connected by the anode to the ground connection 90 and by the cathode connection to the emitter of the transistor $T_{2A}$.

A diode $D_{2A}$ is connected so that its cathode is connected to the collector of the power transistor $T_{2A}$ via a current sensor $S_{D2A}$ and its anode is coupled to the collector of the power transistor $T_{1A}$. The current sensor $S_{D2A}$ supplies a signal to the control unit 100 so that the control unit obtains information on whether current flows through the diode $D_{2A}$.

The other phase windings $W_B$ and $W_C$, respectively, are coupled to current sensors, power transistors and diodes in the same way.

A control unit 100 comprising a microprocessor is arranged to control the switching on and off of the transistor valves. The control unit 100 has six outputs which are connected each via its own amplifier 110 to the base of its own of the six transistor valves. The transistors 110 operate as a valve controller.

The current sensor $S_{WA}$ is, according to one embodiment, a Hall sensor which supplies a measured current value $i_{WAm}$ to the control unit 100. In the same way the measured current values for the windings $W_B$ and $W_C$ are supplied to the control unit 100.

A sensor unit 120 is connected so that it senses the voltage $U_d$ between the positive pole 80 and the ground connection 90. The sensor unit 120 supplies a measured voltage value $U_{dm}$ to the control unit 100. The sensor unit 120 includes, according to one embodiment, a voltage divider with resistors $R_X$ and $R_Y$, which are connected between the positive voltage connection 80 and the ground connection 90. As is illustrated in FIG. 3, the output of the sensor unit 120 is connected to a point 140 between the resistors $R_X$ and $R_Y$ so that the output signal $U_{dm}$, of the sensor is proportional to the drive voltage $U_d$.

FIG. 4 is an equivalent circuit diagram which illustrates the valve bridge for the winding $W_A$ in FIG. 3.

When current flows through a valve, such as e.g. the valve $T2_A$ in FIG. 3, a voltage drop occurs across the valve. The voltage drop across the valve $T2_A$ has been given the reference $U_{T2}$ in FIG. 4. The valve T2 is illustrated in FIG. 4 by an equivalent diagram out of which it is evident that the voltage drop $U_{T2}$ depends partly on the inner series resistance $R_V$ and partly on a fixed voltage drop $U_V$. It is the same for the valve $T1_A$.

The winding $W_A$ has an impedance which is essentially inductive but which also comprises a resistive component. In FIG. 4 this is illustrated by a pure inductance $L_W$ which is connected in series with a resistance $R_W$.

The hall sensor $S_{WA}$ has an extremely low impedance which in this connection can be neglected. It should, however, be noted that the internal impedance of the sensor can be treated in the same way as the resistance $R_W$ in the analysis below, which means that the estimator compensates for both the resistance of the winding and the possible resistance of the current sensor, as is evident from the following.

The torque $T_{WA}$, which is obtained by activating the winding $W_A$, is a function of the current through the winding and the position θ of the rotor:

$$T_{WA}=f_1(i_{WA}, \theta) \tag{1}$$

The rotor position θ can be calculated from the magnetic flow ψ which flows through the corresponding magnetic circuit and the phase current $i_{WA}$:

$$\theta=f_2(i_{WA}, \psi_A) \tag{2}$$

This means that the torque $T_{WA}$ can be expressed as a function of the magnetic flow $\psi_A$ which flows through the corresponding magnetic circuit and the phase current $i_{WA}$:

$$T_{WA}=f_3(i_{WA}, \psi_A) \tag{3}$$

As mentioned above, the current $i_{WA}$ through a phase winding is controlled so that a desired torque $T_W$ is obtained from the activated phase winding, as shown in FIG. 2B. The torque obtained is a function partly of the winding current $i_W$ and partly of the magnetic flow. The magnetic flow ψ depends in turn on the inductance $L_W$ and the current $i_W$. Consequently, $T_W$ is dependent on $i_{WA}$ and $L_{WA}$:

$$T_{WA}=f_4(_{WA}, L_{WA}) \tag{4}$$

The change over time of the magnetic flow, dψ/dt, is equal to the instantaneous voltage drop $U_{LW}$ over the pure inductance $L_{WA}$ in FIG. 4:

$$d\psi/dt=U_{LW} \tag{5}$$

From equation (5) the magnetic flow ψ is obtained by integrating with respect to time:

$$\psi=\int U_{LW} D\tau \tag{6}$$

Equation (3) means that if the magnetic flow ψ can be determined, a desired torque $T_W$ can be produced. Equation (6) means that the magnetic flow ψ can be determined if the voltage $U_{LW}$ is determined.

According to one embodiment of the invention, the magnetic flow ψ is determined according to equation (6), i.e. through a time integration of the voltage $U_{LW}$ over the "pure" inductance $L_W$.

The voltage $U_{LW}$, however, is not able to be measured, because $L_W$ is the inductance in the winding which also has an internal resistive voltage drop $U_{RW}$. According to one embodiment of the invention, therefore, a value $U^*_{LW}$ corresponding to the voltage $U_{LW}$ is produced through an estimation process. This is described in more detail below.

FIG. 4 shows the equivalence diagram for the winding $W_A$. From this it is evident that:

$$U_{LW}=U_W-i_{WA}R_{WA} \tag{7}$$

From equations (5), (6) and (7) it can be seen that $$\psi=\int(U_W-i_{WA}R_{WA})d\tau \tag{8}$$

With reference to FIG. 4 it can be seen that three alternative working states can occur depending on which of the valves T2 and T1 is/are closed resp. open.

I. A First Working State

In a first working state I both the valve T2 and the valve T1 are closed. The voltage $U_{LW}$ is then the part of the voltage across the phase winding which gives rise to a magnetic flow, i.e. the resistive loss in the winding is excluded. In the first working case the voltage $U_{LW}$ will be $$U_{LW}=U_d-i_W(R_W+2R_V)-2U_V \tag{9}$$

II. A Second Working State

In a second working state (II) both active valves T1 resp. T2 are open so that they block, and a current flows in the winding from the ground connection 90 to the positive connection 80. The voltage $U_{LW}$ in this case becomes:

$$U_{LW}=-U_d-i_W \cdot R_W-(U_{D1}+U_{D2}) \tag{10}$$

II. A Third Working State

In a third working state (III) only one of the active valves T1 or T2 is conducting. Assuming that the losses are the same for the diodes D1 resp. D2 and for the active valves T1 resp. T2, the voltage $U_{LW}$ over the "real inductance" $L_W$ of the phase winding will be according to the following:

$$U_{LW}=i_W(R_W+R_V)-(U_V+U_{D1}) \tag{11}$$

By using the above stated equations (9), (10) and (11) for calculating the voltage $U_{LW}$ and the equation (6) above in order to calculate the magnetic flow ψ and with knowledge of which working state the machine is in and by measuring the actual winding current $i_W$, the torque $T_W$, which can be obtained by activation of the winding W, can consequently be calculated with great accuracy in accordance with equation (3).

The control unit determines the actual working state for the winding $W_A$ with the help of the input signal from the diode current sensor $S_{D2A}$ and the output signals from the amplifiers $110_{1A}$ and $110_{1B}$. Each of these three signals has either one of the logical values "CONDUCTS" or "DOES NOT CONDUCT". The actual working state can be read from the state combination of these three signals.

A First Embodiment of an Estimator

Figure 5:
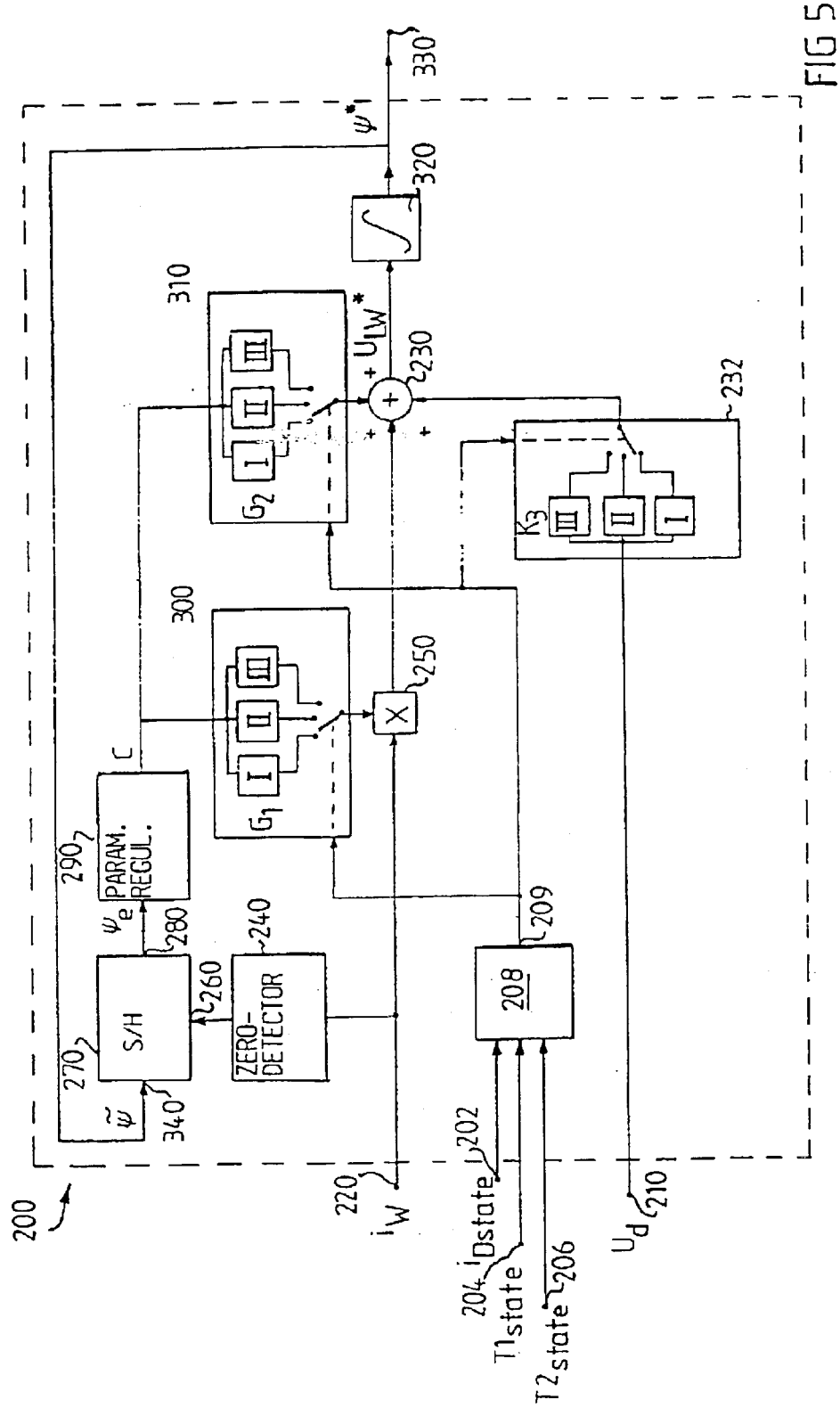
FIG. 5 illustrates an estimator, according to one embodiment of the invention, for estimating the magnetic flow for a phase winding in the motor according to FIG. 1A.

Starting from the above described equation (6) for the magnetic flow ψ and knowing that the magnetic flow originating from a winding in a reluctance motor is zero when the current is zero, the inventors designed the estimator 200 shown in FIG. 5.

FIG. 5 illustrates an estimator according to one embodiment of the invention for estimating a value of the magnetic flow ψ for a winding $W_A$, starting from the above described equations (9)–(11) and (6).

The three equations (9), (10) and (11) can be summarized in an equation which depends on three parameters $K_1$, $K_2$ and $K_3$:

$$U_{LW} = K_3 \cdot U_d + i_W \cdot K_1 + K_2 \quad (12)$$

where the parameter values have the following dependence on the working state:

In the working state I the following applies:

$$K_{1,I} = -(R_W + 2R_V)$$

$$K_{2,I} = -2U_V$$

$$K_{3,I} = 1$$

In the working state II the following applies:

$$K_{1,II} = -(R_W)$$

$$K_{2,II} = -(U_{D1} + U_{D2})$$

$$K_{3,II} = -1$$

In the working state III the following applies:

$$K_{1,III} = -(R_W + R_V)$$

$$K_{2,III} = -(U_V + U_{D1})$$

$$K_{3,III} = 0$$

The parameter $K_1$ is consequently the true total loss resistance in the current circuit at each point of time, and the parameter $K_2$ is the true current-independent voltage drop in the current circuit. The parameter $K_3$ is a variable having absolute value 1, and a positive or negative sign depending on the actual working state.

The estimator 200 comprises an input 202 for receiving the logical value from the sensor $S_{D2A}$ and inputs 204 and 206 for receiving the state for the active valves $T_{1A}$ resp. $T_{2A}$ (see FIGS. 3 and 4). The inputs 202, 204 and 206 are connected to a state analyzer 208 which from the input signal combination determines the actual working state and which supplies a working state signal on an output 209.

The estimator 200 further comprises an input 210 for the measured value $U_{dm}$ which corresponds to the voltage $U_d$ and an input 220 for inputting of the actual current value $i_W$.

The input 210 is connected to an addition point 230 via a multiplication unit 232. The multiplication unit 232 has a control input connected to the working state signal from the analyzer 208. The multiplication unit 232 multiplies the voltage value $U_d$ by the parameter $K_3$ and consequently supplies the value $U_d$, $-U_d$ or 0 to the addition point 230 depending on the actual working state.

The input 220 is connected to an input on a zero detector 240 and to an input on a multiplication point 250. The zero detector 240 has an output which is connected to a trigger input 260 of a sample-and-hold-circuit 270. The sample-and-hold-circuit 270 has an output 280 for a flow error value $ψ_e$. The output 280 is connected to a parameter regulator 290. The parameter regulator 290 produces a variable value C on an output which is connected to a multiplication unit 300 and to a multiplication unit 310.

The output signal from the multiplication unit 300 is the parameter value K1, and the output signal from the multiplication unit 310 is the parameter value K2. The multiplication unit 300 comprises a memory unit with the parameters $G1_I$, $G1_{II}$ and $G1_{III}$ and has a control input connected to the working state signal from the analyzer 208. Depending on the working state, either G1I, G1II or G1III is multiplied by the variable C, and the result is fed to the multiplication point 250. The multiplication unit 310 functions in the same way as the unit 300 but has three parameters $G2_I$, $G2_{II}$ and $G2_{III}$ in its memory unit.

The multiplication unit 300 is connected to the multiplication point 250 and the unit 310 is connected to the addition point 230. The multiplication point 250 has an output which is connected to an input of the addition point 230. The addition point 230 has an output which is connected to an integrator 320. The integrator 320, which produces an estimated magnetic flow value $ψ_{est}$, is connected to an output 330 of the estimator 200. Furthermore, the output of the integrator is connected to a sample-input 340 of the sample-and-hold-circuit 270.

The estimator 200 fictions as follows:

An actual value corresponding to the voltage $U_d$ is fed in on the input 210 and an actual value corresponding to the current $i_W$ is fed in on the input 220. The memory of the multiplication unit 300 is provided with parameters G1, which are so selected that the product C*G1 becomes an approximation of the parameter $K_1$ in the equation (12):

$$C \cdot G_{1,I} = K_1 = -(R_W + 2R_V) \text{ for working state I}$$

The multiplication unit 310 is provided with parameter values G2 so that the product C*G2 is an approximation of the current-independent voltage drop in the active valves T1 resp. T2:

$$C \cdot G_{2,I} = K_2 = -2 \cdot U_V \text{ for working state } I$$

Consequently, on the output from the addition point 230 an estimate of the voltage $U_{LW}$ is obtained. This estimate is fed to the integrator 320, and consequently an estimate of the magnetic flow ψ is obtained on the output 330.

When the current value $i_W$ on the input 220 becomes zero, this is detected by the zero-detector 240 and a trigger signal is supplied to the trigger input 260 of the sample-and-hold-circuit. When receiving tie trigger signal, the sample-and-hold-circuit 270 reads the actual value of the magnetic flow estimate. Because this value, as mentioned above, should be zero when the current value is zero, the sampled value is a representation of the flow estimation error $ψ_e$. This error value is supplied to the parameter regulator 290 which performs an adjustment of the variable C (and thereby the parameter values $K_1$ resp. $K_2$) in such a direction that the flow estimation error value becomes closer to zero. When the estimation error $ψ_e$ has a positive value the estimated resistance value C*G1 needs to be increased in order to decrease the flow estimation error value $ψ_e$. When the estimation error $ψ_e$ has a negative value the estimated resistance value C*G1 needs to be decreased. This process is iterated, so as to improve the estimate of the resistance value and to minimize or eliminate the flow estimation error value $ψ_e$.

Figure 6:
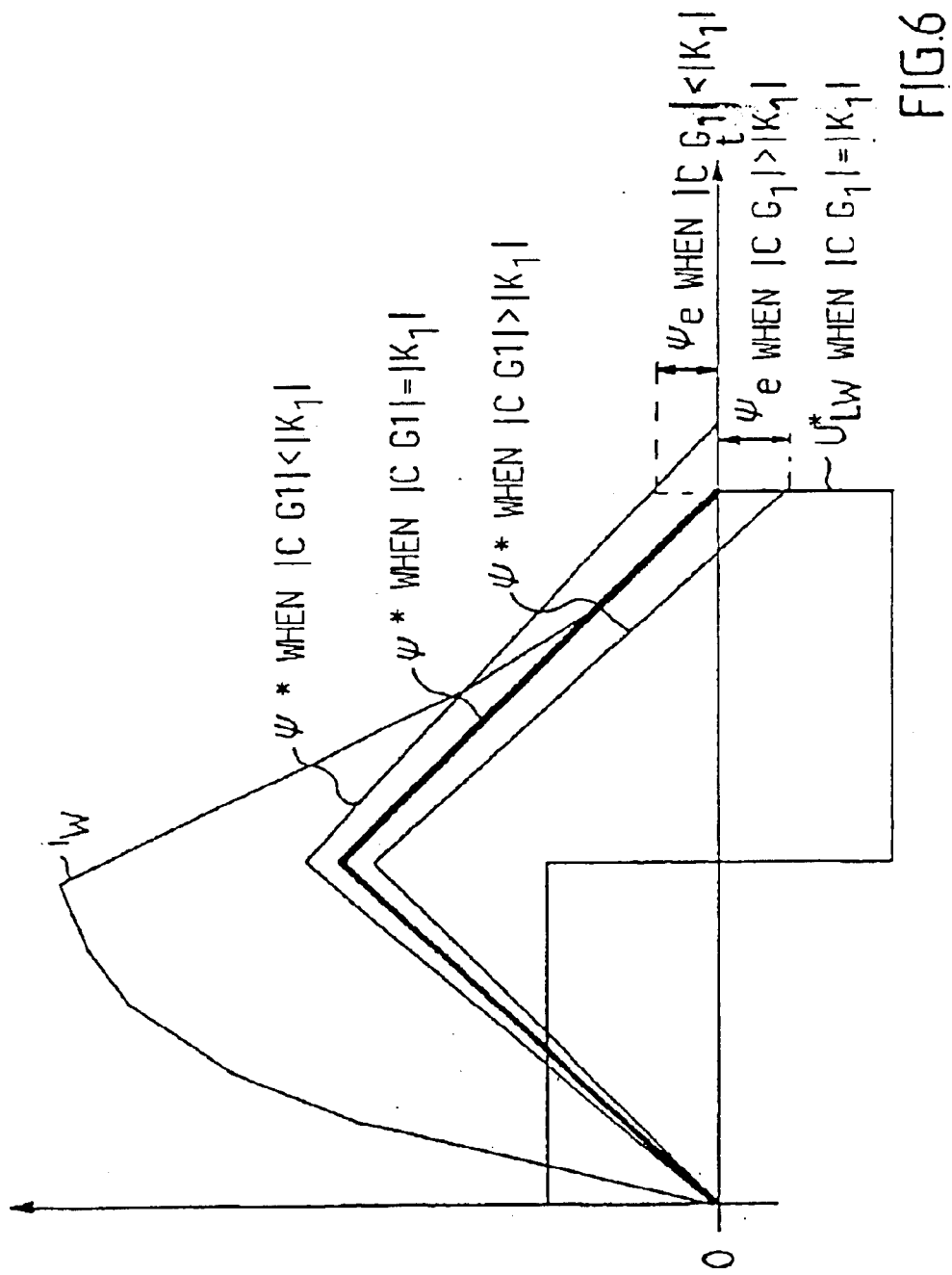
FIG. 6 illustrates an example of period of time for estimating the magnetic flow as it can be produced by the estimator according to FIG. 5.

FIG. 6 illustrates the passage of time for the estimate ψ for the magnetic flow as it is produced by the estimator 200 according to FIG. 5.

In FIG. 6 it is assumed that the voltage $U_d$ is constant and that the current value $i_W$ varies as illustrated in the Figure. The bold line in FIG. 6 illustrates the value of the magnetic flow estimate when C*G1 is equal to the sum $K_1$ of the actual loss resistances, and in FIG. 6 is also illustrated the estimate $U^*_{LW}$ of the voltage $U_{LW}$ which is then produced by the addition point 230 in FIG. 5.

As is evident from FIG. 6, the estimate of the magnetic flow becomes zero at the same time as the current value becomes zero when C*G1 = $K_1$. As mentioned above in connection with FIG. 5, the value of the flow estimation error $ψ_e$ then becomes zero.

FIG. 6 also shows the value of the flow estimate when the absolute value of the product C*G1 is less than the absolute value of $K_1$. As illustrated in FIG. 6, the flow estimate will have a positive value $\psi_e$ when the current $i_W$ passes through zero if the absolute value of the product C*G1 is less than the absolute value of $K_1$. This means that the flow estimation error $\psi_c$, which is outputted from the sample-and-hold-circuit 270 in FIG. 5, can be read in FIG. 6.

The Figure further illustrates an estimate $\psi^*$ for the magnetic flow when the absolute value of the product C*G1 is greater than the absolute value of the true value $K_1$ of the loss resistance.

As shown in FIG. 4 the equivalent diagram for the active valves T2 resp. T1 is made of a resistor $R_V$ and a voltage source which illustrates a constant voltage drop $U_V$ in series with a switch. This equivalent diagram is generally valid for an active valve such as a bipolar transistor, a thyristor, an IGBT and for a MOSFET. For the three mentioned first it is true that the voltage drop $U_V$ has a positive value which is not zero, while for a MOSFET it is true that the voltage drop $U_V$ is substantially equal to zero.

For the passive valves D1 and D2 as shown in FIG. 4B it is true that an essentially constant voltage drop occurs when the valve is forward-driven, i.e. when the valve conducts current. Examples of such passive valves are diodes, such as e.g. a SCHOTTKY-diode. The voltage drop $U_D$ has a positive value different from zero, usually in the order of 0.6 volt.

If the voltage drop $U_V$ and $U_D$ are small in relation to the voltage drop $i_W(R_W+R_V)$, then $U_V$ and $U_D$ can be neglected and the unit 310 in FIG. 5 can be left out, whereby the output signal of the parameter regulator 290 is only multiplied by the parameter $G_1$ in the unit 300.

A Second Embodiment of an Estimator

Figure 7:
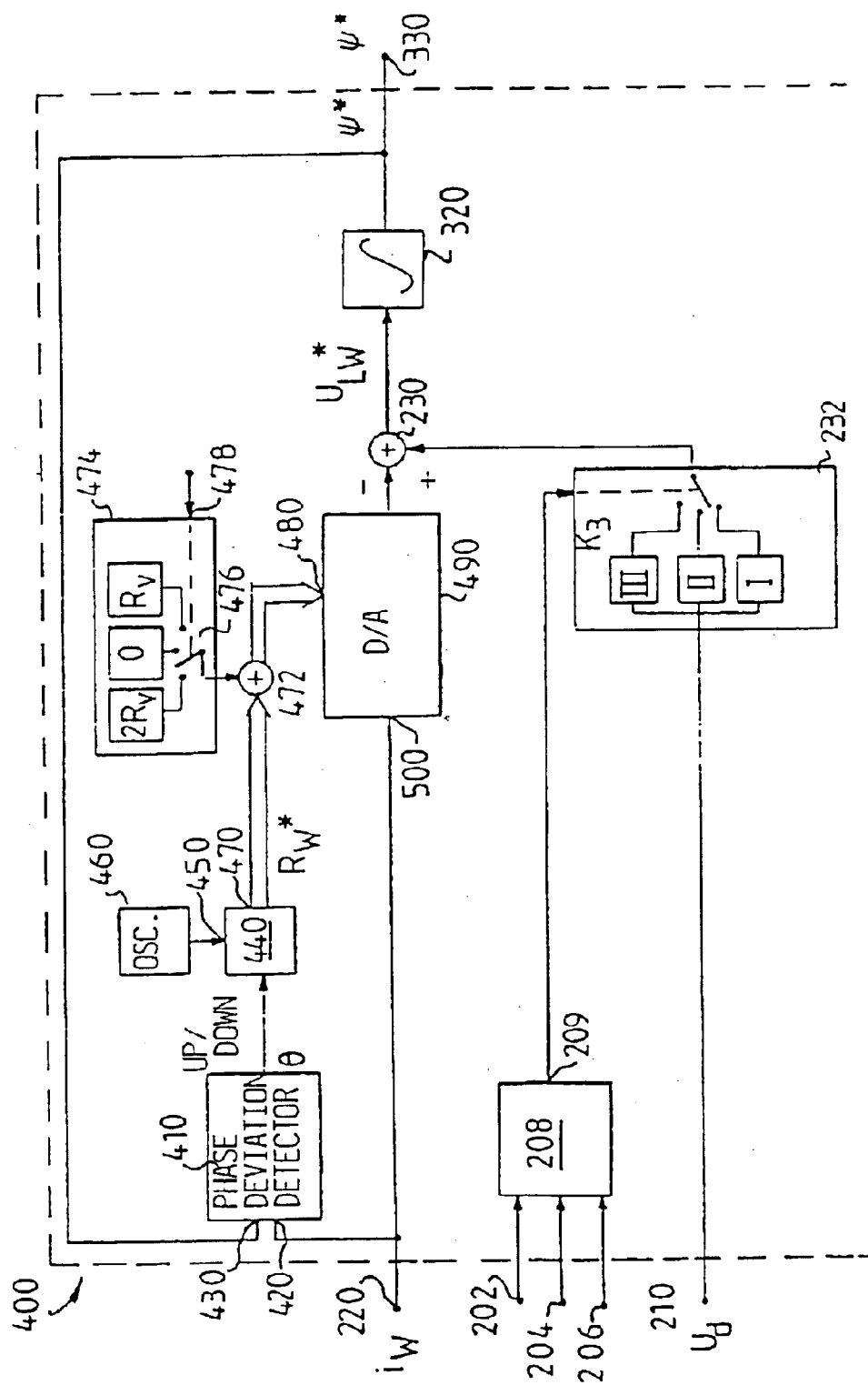
FIG. 7 illustrates a second embodiment of an estimator for estimating the magnetic flow for a phase winding in the motor according to FIG. 1A.

A second embodiment of an estimator for estimating a magnetic flow $\psi$ is shown in FIG. 7. The estimator 400 shown in FIG. 7 corresponds to the estimator shown in FIG. 5 to such an extent that it has an input 210 for a value corresponding to the voltage $U_d$, an input 220 for a value corresponding to the current $i_W$, an output 330 for outputting a magnetic flow estimate and an addition point 230 which produces a value corresponding to an estimate $U^*_{LW}$ of the voltage $U_{LW}$ across the pure inductance, and an integrator 320 for producing a magnetic flow estimate depending on the voltage estimate $U^*_{LW}$.

The estimator 400 differs from the estimator shown in FIG. 5 by comprising a phase error detector 410, one input of which is connected to the input 220 and the other input 430 of which is connected to the output of the integrator 320. The phase error detector has an output for a signal indicating the phase relationship between the current signal and the magnetic flow estimate signal. The output signal from the phase error detector 410 can according to one embodiment of the invention take up one of the following three logical values; Raise, Lower, Freeze. This can be realized e.g. through the phase error detector supplying a signal the value of which has three levels. The output signal of the phase error detector is supplied to a count direction port on a counter 440.

The counter 440 has further a counter input 450 which receives a pulse signal with an essentially constant pulse frequency from an oscillator 460. The counter 440 has an output 470 via which the counter supplies a digital count value. This count value is an estimate of the winding resistance $R_{WA}$.

The count value output 470 is connected to an adder 472 which also receives the actual parameter value $2R_V$, 0 or $R_V$, depending on the actual working state. A parameter unit 474 has memory positions for valve resistance values for the three working states and a switch 476 for outputting the actual valve parameter value depending on a state signal on an input 478. The state signal is supplied from a state analyzer 208 as described above.

The output signal of the adder 472 corresponds to the parameter K1 in equation (12). The output signal is supplied to an input 480 of a digital-analogue-converter 490. The D/A-converter 490 has a reference voltage input 500 which is connected to the input 220 for receiving the analogue value $i_W$.

The estimator 400 functions as follows. As mentioned above, for a reluctance motor it is true that the magnetic flow and the current have the value zero at the same point of time, which means that the current and the magnetic flow in a reluctance motor lie essentially in phase with each other. By means of the phase error detector 410 the phase relationship between the actual current $i_W$ and the estimated magnetic flow $\psi_{est}$ is detected. The count value, which the counter 440 produces, corresponds to the winding resistance $R_W$.

The D/A-converter 490 produces a multiplication of the current value $i_W$ and the count value $K_1$, because an analogue signal $i_{Wm}$ corresponding to the analogue current value $i_W$ is fed in to the reference input of the D/A-converter. Thereby the output signal of the D/A-converter will be an analogue signal the amplitude of which corresponds to the current value multi-plied by the parameter K1 in equation (12).

The counter 440 in combination with the oscillator 460 forms an integrating circuit, and the output signal on the output 470 of the counter is the result of the time integral. According to this embodiment, the parameter value $K_1$ will be continuously adjusted depending on the phase relationship so that the phase error is minimized, i.e. so that the magnetic flow estimate is adapted to lie in phase with the actually measured current $i_W$ fed in to the input 220 of the estimator. This brings the advantage that the estimator automatically adjusts the control parameter $K_1$ so that the magnetic flow estimate corresponds also when the motor winding changes its series resistance $R_W$ and when the transistors T1 resp. T2 change their series resistance, e.g. as a consequence of temperature changes.

A Third Embodiment of an Estimator

A third embodiment of the estimator corresponds to the estimator 400 in FIG. 7, but the adder 472 and the parameter unit 474 are removed, i.e. the output 470 of the counter is coupled directly to the input 480 of the D/A-converter. This embodiment of the estimator is therefore advantageously simply constructed. This embodiment involves the approximation that the resistance $R_V$ of the valves are neglected. From equation (9) it can be understood that an accurate estimate of the magnetic flow is obtained even by the third embodiment when the valve resistance $2R_V$ is much less than the winding resistance $R_W$. For a certain current value and a certain magnetic flux value $\psi$ the position of the rotor can be established by analysis of the sign of $d\psi/dt$, i.e. the sign of $U_{LW}$.

According to a preferred embodiment, however, the position is established by combining the magnetic flux estimates for at least two windings.

A Fourth Embodiment of an Estimator

Figure 8:
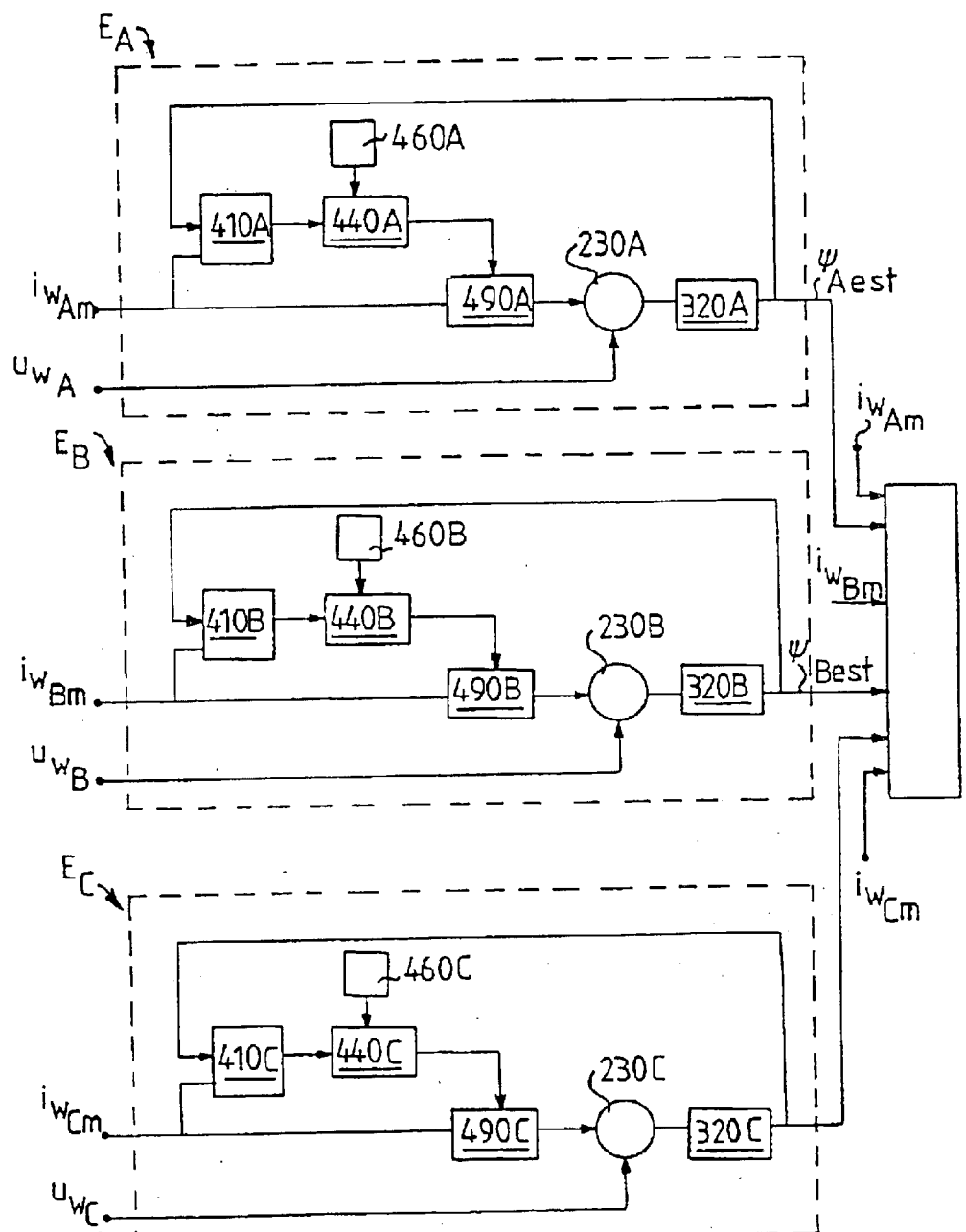
FIG. 8 illustrates yet another embodiment of the estimator.

According to a fourth embodiment of the estimator, shown in FIG. 8, a rotor position for a motor having three windings, $W_A$, $W_B$, and $W_C$ is determined. The estimator comprises one flux estimation unit $E_A$ for obtaining an estimate $\psi_{Aest}$ of the magnetic flux $\psi_A$, another flux estimation unit $E_B$ for obtaining an estimate $\psi_{Best}$ of the magnetic flux $\psi_B$ and a third flux estimation unit $E_C$ for obtaining an estimate $\psi_{Cest}$ of the magnetic flux $\psi_C$. The position θ can be determined from a combination of the instantaneous values of the flux values $\psi_A$, $\psi_B$, $\psi_C$ and the instantaneous current values $i_{WA}$, $i_{WB}$, $i_{WC}$.

For some motor drive situations a sufficient control accuracy is obtained when the resistive loss $R_V$ in the valves is neglected and the voltage drop in the valves $U_D$ and in the diodes are also neglected. In such cases each flux estimation unit can be advantageously simply designed by neglecting the losses $R_V$ and $U_D$, as indicated in FIG. 8. In the FIG. 8 embodiment signals indicating the voltages $U_W$ across the windings are delivered directly to the estimation units. These voltage signals may be obtained by a multiplication unit 232 as described in connection with FIG. 5 or 7, or by measurement. According to one embodiment the measurement of the winding voltage $U_W$ includes measuring the switched voltage across the winding and integrating the measured voltage signal over time using a time constant so as to obtain a useful measurement value.

An Embodiment of a Control Unit

Figure 9:
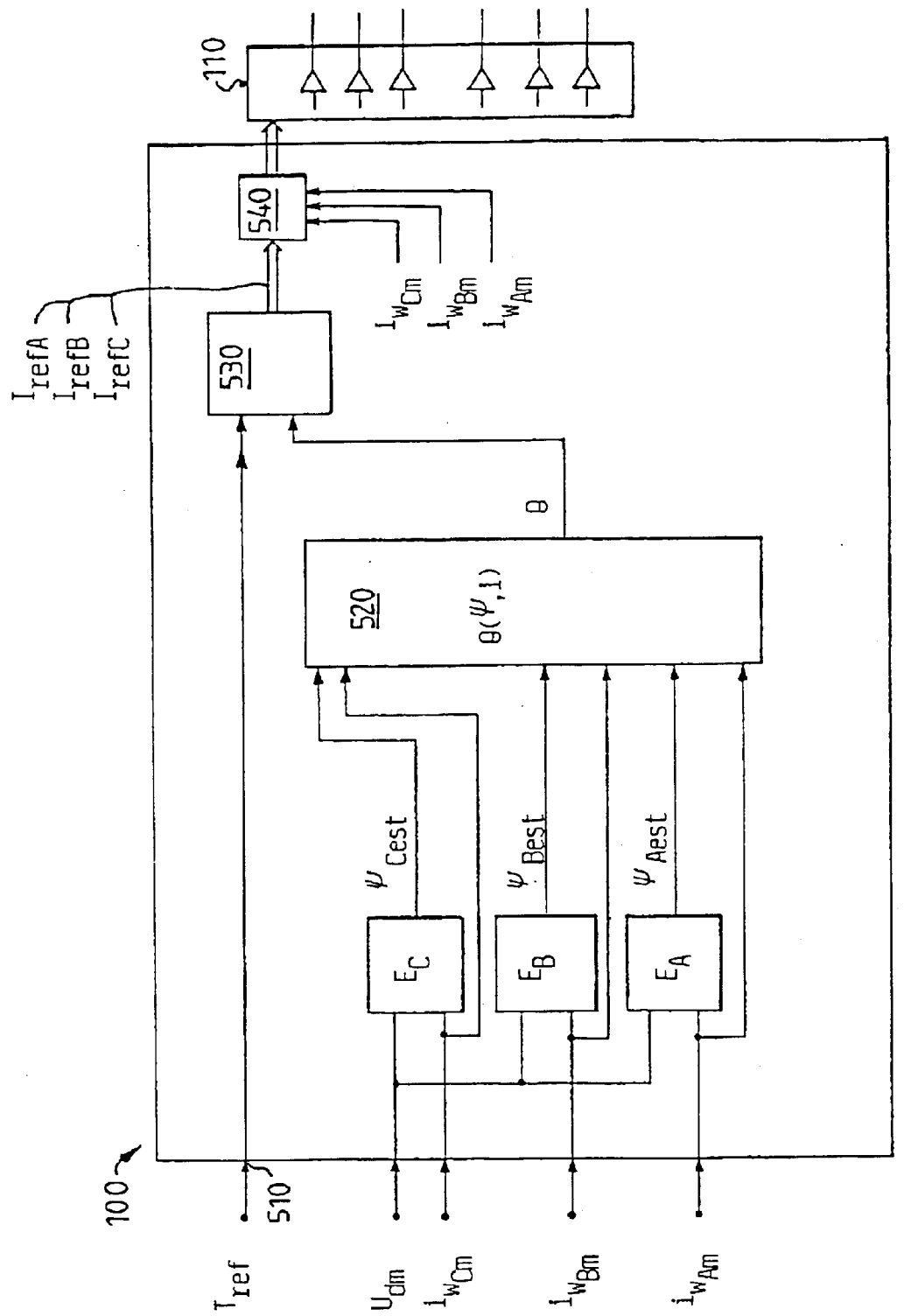
FIG. 9 is a block diagram illustrating an embodiment of the control apparatus shown in FIG. 3.
Figure 10:
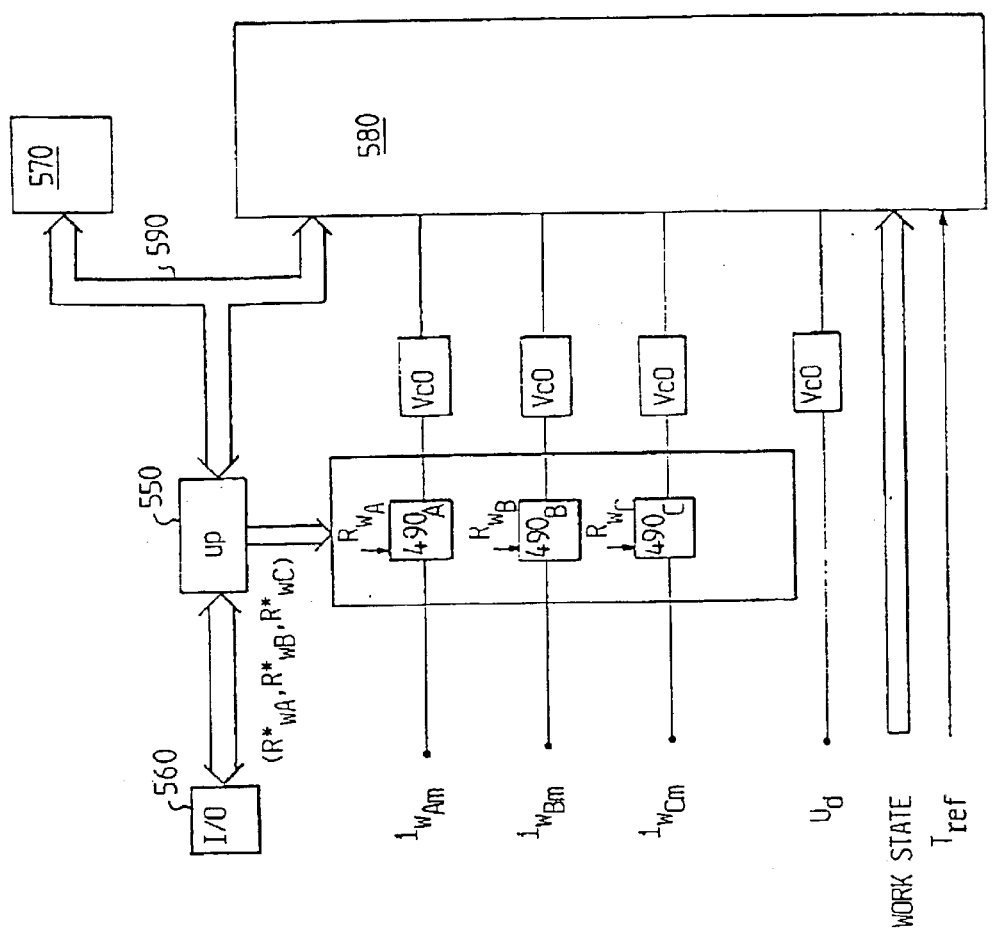
FIG. 10 is a block diagram of a part of the control apparatus shown in FIG. 3, according to an embodiment of the invention.

FIG. 9 is a block diagram illustrating an embodiment of the control unit 100 shown in FIG. 3. The control unit 100 has inputs for the winding currents and for the voltage $U_{dm}$, as described above. These signals are fed to estimators $E_C$, $E_B$, $E_A$ operating to estimate the instantaneous magnetic fluxes and the parameter K1, $R_W$. The winding current values and the estimated magnetic fluxes are delivered to a device 520 for establishing the position $\theta$ in response thereto. The position value is delivered to a unit 530 for generating reference current values $I_{Aref}$, $I_{Bref}$, $I_{cref}$. The control unit 100 also includes an input 510 for receiving a torque reference value i.e. an input for setting a desired motor torque. The unit 530 generates current reference values in response to the torque reference value and the position value. A regulator 540 provides control pulses to the valves in response to the current reference signals $I_{Aref}$, $I_{Bref}$, $I_{cref}$ and the measured current values $I_{WA}$, $I_{WB}$, $I_{WC}$ FIG. 10 is a block diagram of a part of the control unit 100, according to an embodiment, including a microprocessor 550 coupled to an input/output port 560, a memory 570 and a programmable logic circuit (PLD) 580. Signals indicating the winding currents are delivered to a set of multiplication units 490. The multiplication units are provided with updated instantaneous estimates of the respective winding resistances $R_{WA}$, $R_{WB}$, $R_{WC}$ by a bus coupled to the processor 550. The output of each multiplication unit 490 is a voltage signal indicating the product of instantaneous current and winding resistance. Each such voltage signal is delivered to a VCO which transforms it to an oscillating signal. The oscillating signals are delivered to the PLD 580. The PLD 580 receives an oscillating signal indicating the voltage $U_d$ and therefrom it calculates the voltage $U_{LW}$ as described above. The PLD 580 also integrates the voltage $U_{LW}$ over time thereby generating a magnetic flux estimate. A real time magnetic flux estimate error is generated by comparison with the current measurement signal. The PLD 580 delivers the resulting magnetic flux error $\psi_{err}$ in real time via bus 590 to the processor 550. The processor operates in accordance with a computer program stored in the memory 570. The program includes a routine for estimating the resistances $R_{WA}$, $R_{WB}$, $R_{WC}$, and these estimated values are updated and delivered to the multiplication units 490. The multiplication units may operate as described with reference to FIG. 7. The PLD may operate to calculate a real time magnetic flux estimate error value $\psi_{Aerr}$ by freezing the instantaneous value of the flux estimate $\psi_A$ at each moment the winding current $i_A$ is zero. Hence, the processor receives magnetic flux error values $\psi_{Aerr}$, $\psi_{Berr}$, $\psi_{Cerr}$ obtained at zero current for the respective winding. The processor calculates a corrected resistance value in response thereto.

Figure 11:
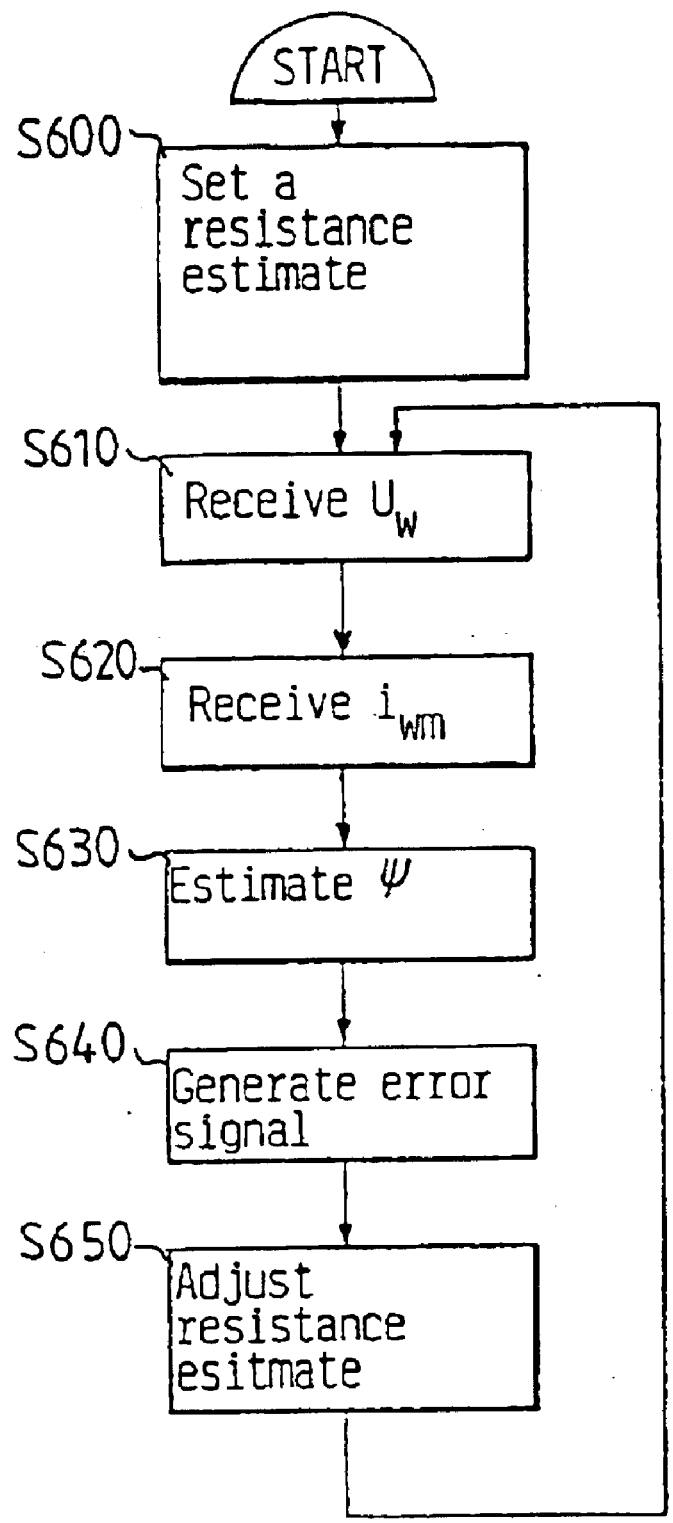
FIG. 11 is a flow chart illustrating an embodiment of a process of generating an estimate of a winding resistance.

The process of generating an estimate of a winding resistance $R_W$ as embodied by a combination of a processor and a computer program is described in FIG. 11. The process may be performed on only one phase winding so as to obtain the resistance in that one phase winding. According to an embodiment preferred for machine control purposes the process is performed for several windings. The process may start with a pre-set value for the resistance estimate (step S600). The reluctance machine is started and when the machine moves the voltages $U_{wA}$, $U_{wB}$, $U_{wC}$ across each winding is measured, or calculated from the voltage $U_d$, (stepS610) the winding currents $i_{WA}$, $i_{WB}$, $i_{WC}$, are measured (stepS620) and, in stepS630, magnetic flux estimates are obtained by integration as described above. An error signal is generated (stepS640) by comparing the real time estimate of the magnetic flux with the current measurement value. The resistance estimate is adjusted in response to the error signal as described below.

According to one embodiment the microprocessor 550, when executing the program routine stored in memory 570 is directed to receive the flux error signals from the PLD 580 and to adjust the resistance estimate value in response to the sign and the value of the error signal. When the estimation error $\psi_c$ has a positive value the program directs the processor to increase the estimated resistance value. When the estimation error by $\psi_c$ has a negative value the program directs the processor to decrease the estimated resistance value. The PLD 580 subsequently generates a new flux value based on the adjusted resistance estimate value. A new error signal is generated based on the flux value at the time of zero current in the winding, and that error signal is provided to the processor 550. This process is iterated so as to improve the estimate of the resistance value and to minimize or eliminate the flow estimation error value $\psi_c$.

According to another embodiment the PLD also delivers digital signals corresponding to the measured current signals $i_{WAm}$, $i_{WBm}$, $i_{WCm}$ and $U_d$ to the processor 550 via bus 590. The microprocessor 550, when executing the program routine stored in memory 570 is directed to receive the signal $U_{dm}$ indicating a voltage $U_{WA}$ across the relevant phase winding $W_A$, and to receive a signal $i_{WAm}$ indicating a current $i_{wA}$ through the relevant phase winding $W_A$. Thereafter the program in the memory 570 directs the microprocessor to estimate a magnetic flux in response to the voltage signal and the current signal. This may be achieved by performing a numerical integration. The program directs the processor to generate an error signal by comparing hie instantaneous current measurement signal with the estimated magnetic flux. The microprocessor 550 is then directed to adjust the resistance estimate value in response to the sign and the value of the error signal, as described above.

According to one embodiment the processor in co-operation with the program additionally calculates the position of the rotor and generates control signals for the valves.

The program may be installed into the memory 570 by feeding it via I/O-port 560. Alternatively the circuit shown in FIG. 10 includes a socket into which a recording medium, such as a non-volatile memory (PROM), is releasably attachable. The recording medium includes machine readable instructions for directing the processor, as described above.

The invention advantageously allows an existing state of the art controller for a reluctance machine to be improved by installing a program implementing the resistance estimation process. Thereby improved estimates of magnetic flux is achieved and regulation of the torque at both high and low rotation speeds is obtained.

Temperature Measurement

The actual resistance of the winding may have a temperature dependence related to the electrically conducting material used in the winding. The estimated value for the winding resistance can therefore be used to indicate the instantaneous average temperature in the winding. With knowledge of the winding resistance at a certain temperature and with knowledge of the temperature coefficient for the material in the winding the temperature can be calculated from the instantaneous resistance value $R_W$.

Rotation Speed-independent Regulation of the Torque

By controlling the active valves $T1_A$, $T2_A$, $T1_B$, $T2_B$, $T1_C$, $T2_C$ (see FIG. 3) using any one of the above described estimators, the torque and speed of rotation of the machine can be controlled with great accuracy and reduced energy loss, because the valves can be activated to drive current through the windings $W_A$, $W_B$, $W_C$ when the torque yield is the greatest. Furthermore, regulation according to the invention means that the machine can be controlled with improved accuracy and essentially independently of the speed of rotation. The reduced dependence of the speed of rotation can be seen below:

As mentioned above in connection with FIG. 2A, the inductance LW changes depending on the position θ when the reluctance machine is driven. The magnetic flow ψ changes depending on the inductance and the current. When the magnetic circuit is not saturated, the relationship will be:

$$\psi = L_W(\theta) * i_W \qquad (13)$$

Derivation with respect to time gives:

$$d\psi/dt = L_W(\theta)*di_W/dt + dL_W(\theta)/d\theta*d\theta/dt*i_W \qquad (14)$$

From equations (5) and (7) above can be seen that:

$$U_W = D\psi/dt + R_W*i_W \qquad (15)$$

Putting equation (14) into equation (15) shows that:

$$U_W = L_W(\theta)*di_W/dt + dL_W(\theta)/d\theta*d\theta/dt*i_W + R_W*i_W \qquad (16)$$

where dθ/dt is the rotor angular frequency, i.e. the rotational speed of the machine.

The second term $dL_W(\theta)/d\theta*d\theta/dt*i_W$ n equation (16) causes the torque of the machine while the third term $R_W*i_W$ is pure loss. Because the second term is proportional to the speed of rotation, it can be seen that a great amount of the winding voltage $U_W$ leads to power losses at low speeds of rotation.

Equally it can be seen from equation (16) that if the reluctance machine would be regulated with the assumption that tie winding resistance $R_W$ is a predetermined constant $R_C$ corresponding to the sum of the resistances in a phase winding the error, when the actual winding resistance $R_W$ deviates from the predetermined constant $R_C$, would be greatest at low speeds of rotation. Because the winding resistance has a certain temperature dependence, the actual winding resistance $R_W$ changes during the operation of the machine. An estimator according to the invention brings the advantage that the regulation of the machine can be adapted to the actual winding resistance of the machine, and thereby the regulation of the machine can be produced with good accuracy at all speeds of rotation and over a large temperature range.

What is claimed is:

1. A method for estimating a resistance in at least one phase winding in a reluctance machine, the method comprising:
   receiving a signal indicating a voltage across the at least one phase winding;
   receiving a signal indicating a current through the at least one phase winding;
   estimating a magnetic flux in response to the voltage signal and the current signal; and
   estimating the resistance in the phase winding in accordance with a phase relation between the current signal and the magnetic flux estimate;
   wherein the resistance estimation further comprises:
   determining a relation or a difference value between the magnetic flux estimate and the current signal; and
   adjusting the estimated resistance depending on the difference value or the relationship value;
   wherein the adjustment of the estimated resistance comprises:
   determining a phase difference between the magnetic flux estimate and the current signal; or
   determining an amplitude of the magnetic flux estimate at a predetermined amplitude level of the current signal.

2. The method according to claim 1, further comprising: adjusting the magnetic flux estimation using the estimated resistance.

3. The method according to claim 1, further comprising: establishing a mutual position between a first and a second part of a reluctance machine in response to the current signal and the magnetic flux estimate.

4. The method according to claim 1, further comprising: establishing a current reference value in response to a torque reference value and the magnetic flux estimate.

5. The method according to claim 1, wherein the resistance estimation further comprises:
   determining a relation or a difference value between the magnetic flux estimate and the current signal; and
   adjusting the estimated resistance depending on the difference value or the relationship value.

6. The method according to claim 5, wherein the adjustment of the estimated resistance influences a subsequently produced magnetic flux estimate so that the absolute value of the difference value is minimized.

7. The method according to claim 5, wherein the adjustment of the estimated resistance comprises:
   increasing the estimated resistance when the difference value has a first sign and reducing the estimated resistance when the difference value has a second sign.

8. The method according to claim 1, further comprising: generating a winding temperature value on a basis of said estimated resistance.

9. The method according to claim 8, wherein said winding temperature value is based on information including:
   the phase winding resistance at a certain temperature; and
   a temperature coefficient for a material in said phase winding.

10. A device for estimating a resistance in at least one phase winding in a reluctance machine having at least two mutually movable parts, said phase winding having an inductance which depends on the mutual position of the parts; the device comprising:
    an input for receiving a signal indicating a voltage across the at least one phase winding;
    an input for receiving a signal indicating a current through the at least one phase winding;
    a microprocessor; and
    a memory having a computer program to direct the microprocessor to perform a process of estimating an instantaneous resistance; wherein
    the microprocessor is coupled to the memory and to the signal inputs such that, during execution of the computer program, the microprocessor performs the process of
    receiving a signal indicating a voltage across the at least one phase winding,
    receiving a signal indicating a current through the at least one phase winding;
    estimating a magnetic flux in response to the voltage signal and the current signal; and
    estimating the resistance in the phase winding in accordance with a phase relation between the current signal and the magnetic flux estimate during execution of the estimate;

wherein the resistance estimation further comprising:
   determining a relation or a difference value between the magnetic flux estimate and the current signal; and
   adjusting the estimated resistance depending on the difference value or the relationship value;
wherein the adjustment of the estimated resistance comprises:
determining a phase difference between the magnetic flux estimate and the current signal; or
determining an amplitude of the magnetic flux estimate at a predetermined amplitude level of the current signal.

11. A computer program product for estimating a resistance in at least one phase winding in a reluctance machine having at least two mutually movable parts, said phase winding having an inductance which depends on the mutual position of the parts; the computer program product comprising:
   a recording medium; and
   a computer program recorded on the recording medium to direct a microprocessor to perform the process of;
   receiving a signal indicating a voltage across the at least one phase winding;
   receiving a signal indicating a current through the at least one phase winding;
   estimating a magnetic flux in response to the voltage signal and the current signal; and
   estimating the resistance in the phase winding in accordance with a phase relation between the current signal and the magnetic flux estimates;
wherein the resistance estimation further comprises:
   determining a relation or a difference value between the magnetic flux estimate and the current signal; and
   adjusting the estimated resistance depending on the difference value or the relationship value;
wherein the adjustment of the estimated resistance comprises:
   determining a phase difference between the magnetic flux estimate and the current signal; or
   determining an amplitude of the magnetic flux estimate at a predetermined amplitude level of the current signal.

* * * * *